(12) United States Patent
Kim

(10) Patent No.: US 8,668,996 B2
(45) Date of Patent: Mar. 11, 2014

(54) BATTERY PACK

(75) Inventor: Cheonsoo Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 297 days.

(21) Appl. No.: 12/789,403

(22) Filed: May 27, 2010

(65) Prior Publication Data

US 2010/0316892 A1      Dec. 16, 2010

(30) Foreign Application Priority Data

Jun. 16, 2009  (KR) .................. 10-2009-0053486

(51) Int. Cl.
*H01M 14/00* (2006.01)
(52) U.S. Cl.
USPC ............................................................ 429/7
(58) Field of Classification Search
USPC ............................................................ 429/7
See application file for complete search history.

(56) References Cited

U.S. PATENT DOCUMENTS

| | | | |
|---|---|---|---|
| 2003/0173709 A1 | 9/2003 | Iwaizono et al. | |
| 2006/0093896 A1 | 5/2006 | Hong et al. | |
| 2006/0118931 A1 | 6/2006 | Ho et al. | |
| 2007/0026302 A1 | 2/2007 | Yoon | |
| 2008/0118820 A1 | 5/2008 | Jang et al. | |
| 2009/0068501 A1 | 3/2009 | Hong et al. | |
| 2009/0111013 A1 | 4/2009 | Jang | |
| 2009/0111018 A1 * | 4/2009 | Park et al. .................... | 429/179 |
| 2009/0123834 A1 | 5/2009 | Byun | |
| 2010/0075205 A1 * | 3/2010 | Kwag et al. .................... | 429/61 |
| 2010/0151280 A1 | 6/2010 | Koh et al. | |

FOREIGN PATENT DOCUMENTS

| | | | | |
|---|---|---|---|---|
| CN | 1767232 | 5/2006 | | |
| CN | 101188279 | 5/2008 | | |
| CN | 101425607 (A) | 5/2009 | | |
| CN | 101436681 (A) | 5/2009 | | |
| EP | 1 753 053 | 7/2006 | | |
| EP | 1753053 A1 * | 2/2007 | ............. | H01M 2/10 |
| JP | 2009-110955 | 5/2009 | | |
| KR | 10-2007-0013568 | 1/2007 | | |
| KR | 10-0791551 | 12/2007 | | |
| KR | 10-0851963 | 8/2008 | | |
| KR | 10-2009-0030706 | 3/2009 | | |
| KR | 10-2009-0053638 | 5/2009 | | |
| KR | 1020090053638 | * 5/2009 | ............. | H01M 2/10 |
| KR | 10 2010 0067330 | 6/2010 | | |
| WO | WO 2009/025433 | 2/2009 | | |
| WO | WO 2009/066953 | 5/2009 | | |

OTHER PUBLICATIONS

Extended European Search Report for corresponding EP Application No. 10163952.4.

(Continued)

*Primary Examiner* — Karie O'Neill Apicella
(74) *Attorney, Agent, or Firm* — Knobbe, Martens, Olson & Bear, LLP

(57) ABSTRACT

A battery pack is disclosed. The battery pack includes a bare cell comprising a cap plate and an electrode terminal positioned on a center region of the cap plate; an insulating layer positioned over the cap plate, wherein the insulating layer comprises a first terminal hole formed in a region corresponding to the electrode terminal; and a protective circuit module positioned over the insulating layer, wherein the protective circuit module comprises a protective circuit board having a second terminal hole formed in a region corresponding to the electrode terminal.

17 Claims, 7 Drawing Sheets

(56) References Cited

OTHER PUBLICATIONS

Chinese Office Action dated Oct. 17, 2012 for Chinese Patent Application No. CN 201010163722.0 which shares priority of Korean Patent Application No. KR 10-2009-0053486 with captioned U.S. Appl. No. 12/789,403.

Office Action dated Jun. 6, 2013 for corresponding CN Application No. 201010163722.0.

Office Action dated Apr. 2, 2013 for corresponding JP Application No. 2009-230791.

* cited by examiner

BATTERY PACK

CROSS-REFERENCE TO RELATED APPLICATION

This application claims priority to and the benefit of Korean Patent Application No. 10-2009-0053486, filed on Jun. 16, 2009, the entire content of which is incorporated herein by reference.

BACKGROUND

1. Field

The present disclosure relates to a battery pack.

2. Description of the Related Technology

A lithium ion battery pack may include a core pack having a bare cell and a protective circuit module. The bare cell may include a positive electrode plate, a negative electrode plate, an electrolyte, and a separator to supply electric power to an external electronic device and to be repeatedly charged and discharged. The protective circuit module may protect the battery pack against overcharge and over-currents and may improve performance by preventing deterioration of the battery pack due to over-discharge.

SUMMARY

Embodiments of the present invention provide a small size battery pack with increased capacity density. The aspects of embodiments of the present invention are not limited to the above-described technical problems, but to other problems not described above that may be understood by those skilled in the art from the following description.

In accordance with one embodiment, a battery pack includes: a bare cell including a cap plate and an electrode terminal positioned in a center of the cap plate; an insulating layer positioned on the cap plate and including a first terminal hole formed in a region corresponding to the electrode terminal; and a protective circuit module positioned on the insulating layer and including a protective circuit board having a second terminal hole formed in a region corresponding to the electrode terminal.

In accordance with another embodiment, a battery pack includes: a bare cell including a cap plate, an electrode terminal protruding from a center of a top of the cap plate, and an electrolyte injection cover protruding from one side of the top of the cap plate; an insulating layer positioned on the cap plate and including a first terminal hole formed in a region corresponding to the electrode terminal; and a protective circuit module positioned on the insulating layer and including a second terminal hole formed in a region corresponding to the electrode terminal, wherein one side of the insulating layer and one side of the protective circuit board are positioned between the electrode terminal and the electrolyte injection cover.

The battery pack according to the above embodiments may be miniaturized by compactly arranging elements of the battery pack. Therefore, the battery pack may be reduced in volume o that the capacity density of the battery pack may be increased.

BRIEF DESCRIPTION OF THE DRAWINGS

The objectives, features and advantages of the present disclosure will be more apparent from the following detailed description in conjunction with the accompanying drawings, in which.

DETAILED DESCRIPTION

Figure 1:
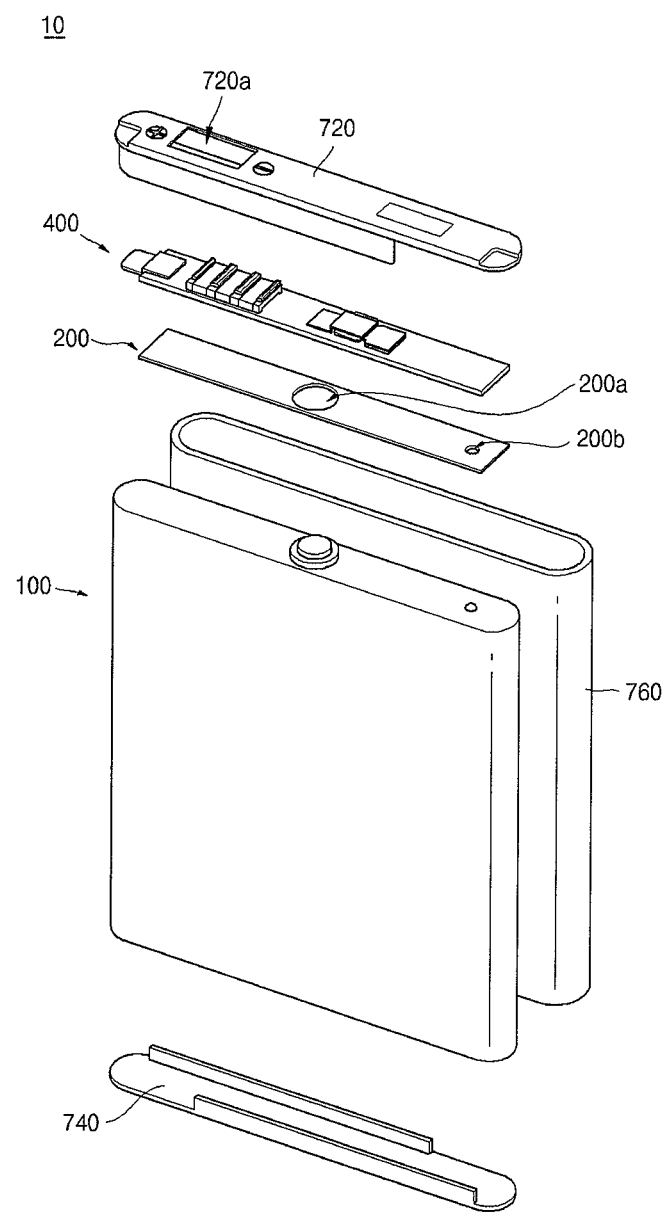
FIG. 1 is an exploded perspective view illustrating a battery pack according to an embodiment.

Specific features of embodiments of the invention are set forth. The advantages and aspects of the embodiments and methods of achieving the same will become apparent in the detailed description with the accompanying drawings. The same reference numerals are assigned to the same elements throughout the drawings.

Hereinafter, battery packs according to various embodiments will be described in detail with reference to the accompanying drawings.

FIG. 1 is an exploded perspective view illustrating a battery pack 10 according to an embodiment of the present invention.

Referring to FIG. 1, the battery pack 10 according to one embodiment may include a bare cell 100, an insulating layer 200, a protective circuit module 400, a top case 720, a bottom case 740, and a label 760. The insulating layer 200 may be positioned on the bare cell 100, and the protective circuit module 400 may be positioned on the insulating layer 200 to contact the insulating layer 200 such that the protective circuit module 400 is electrically and mechanically connected to the bare cell 100. The top case 720 may be positioned to surround the top sides of the protective circuit module 400 and the bare cell 100, and the bottom case 740 may be positioned to cover the bottom side of the bare cell 100. The top case 720 may be coupled to the bare cell 100 by an adhesive. The external surface of the bare cell 100 may be surrounded by a label 760 for protection.

Figure 2:
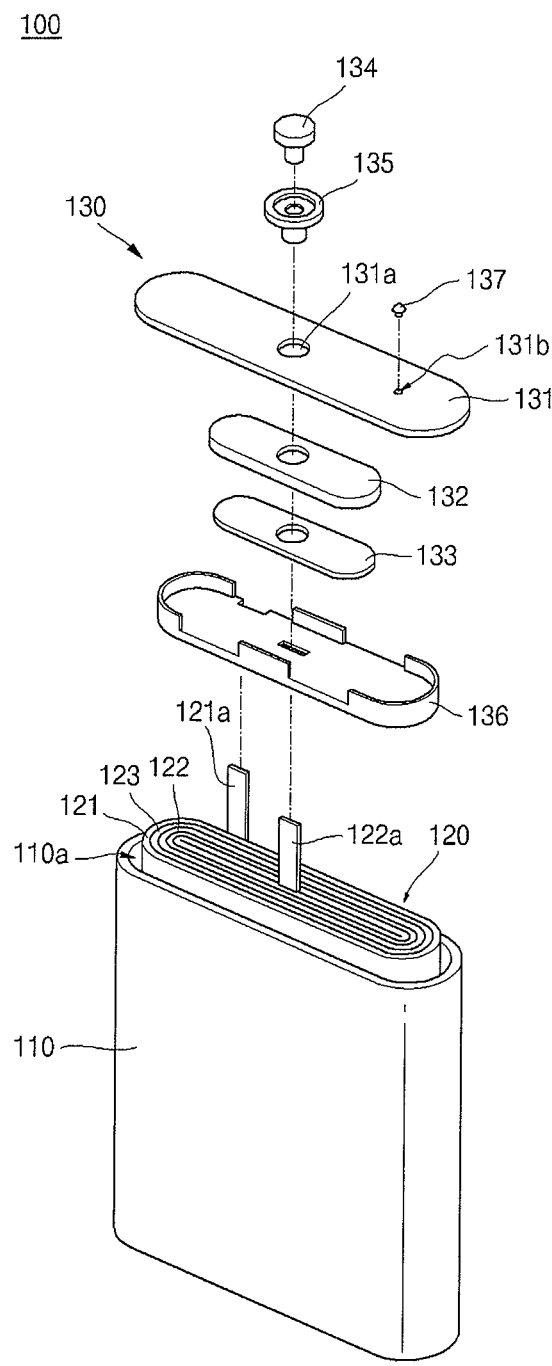
FIG. 2 is an exploded perspective view illustrating a bare cell in the battery pack according to an embodiment.
Figure 3:
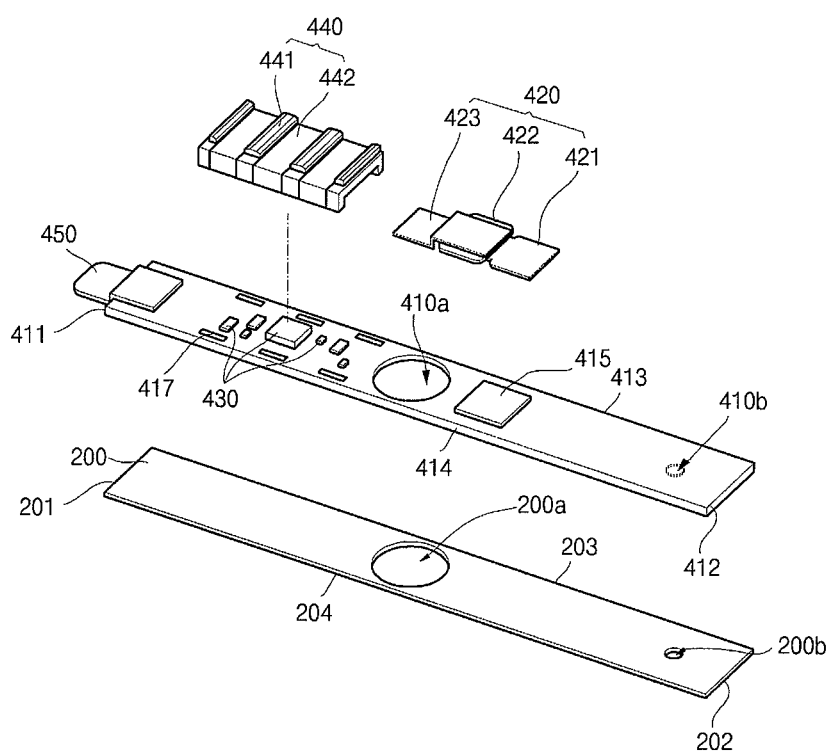
FIG. 3 is an exploded perspective view illustrating a protective circuit module in the battery pack according to an embodiment.
Figure 4:
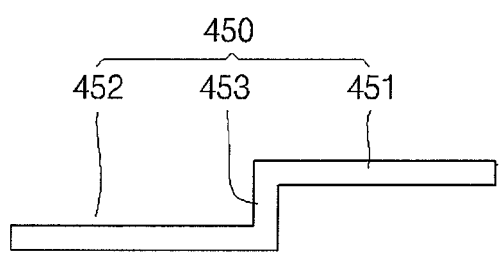
FIG. 4 is a sectional view illustrating a lead plate in the battery pack according to an embodiment.
Figure 5:
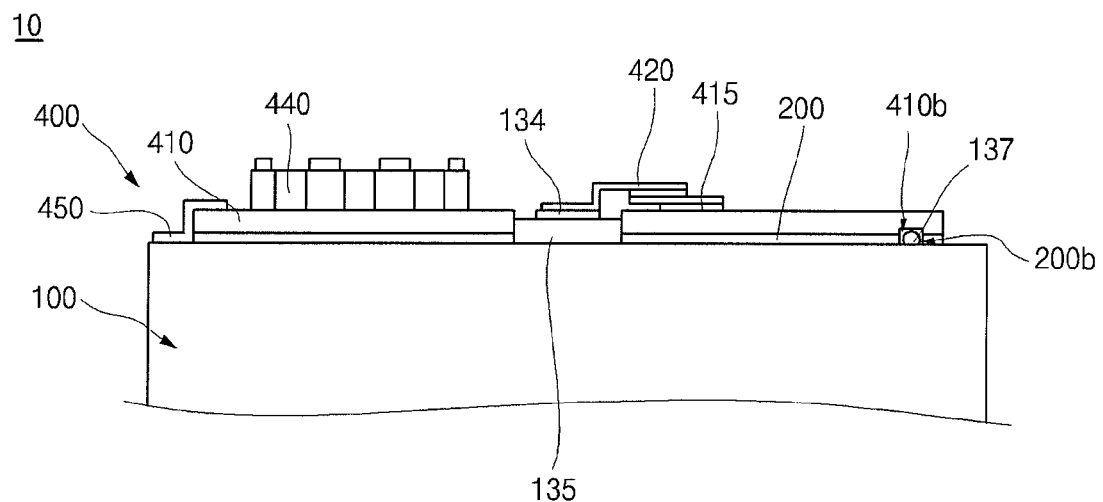
FIG. 5 is a sectional view illustrating the battery pack according to an embodiment.

FIG. 2 is an exploded perspective view illustrating a bare cell in the battery pack according to an embodiment. FIG. 3 is an exploded perspective view illustrating the protective circuit module in the battery pack according to an embodiment. FIG. 4 is a sectional view illustrating a lead plate in the battery pack according to an embodiment. FIG. 5 is a sectional view illustrating the battery pack according to an embodiment.

Referring to FIG. 1 and FIG. 2, the bare cell 100 may include a can 110, an electrode assembly 120 accommodated in the can 110, and a cap assembly 130 covering the opening 110a of the can 110.

The approximately rectangular or parallelepiped can 110 may include an opening 110a. The can 110 may be made of a metal material and may serve as a terminal.

The electrode assembly 120 may be inserted into the can 110 through the opening 110a of the can 110. The electrode assembly 120 may be made in a Jelly-Roll shape by winding a first electrode plate 121, a second electrode plate 122, and a separator 123 positioned between the first electrode plate 121 and the second electrode plate 122. The battery pack 10 may supply electric power through the electrode assembly 120 while repeatedly charging and discharging.

The first electrode plate 121 may include a first electrode collector (not shown) and a first electrode coating portion (not shown). A first electrode tab 121a may be connected to one end of the first electrode plate 121 to protrude toward the opening 110a of the can 10.

The second electrode plate 122 may include a second electrode collector (not shown) and a second electrode coating portion (not shown). A second electrode tab 122a may be connected to one end of the second electrode plate 122 to protrude toward the opening 110a of the can 10.

In general, the can 110 that functions as a terminal in the polygonal battery pack 10 may be a positive electrode. In this case, when the first electrode plate 121 is a positive electrode, the outermost electrode plate of the jelly-roll electrode assembly 120 may be the first electrode plate 121 that is the positive electrode. In addition, when the first electrode plate 121 is a negative electrode, the outermost electrode plate of the jelly-roll electrode assembly 120 may be the second electrode plate 122 that is a positive electrode.

Hereinafter, embodiments will be described assuming that the first electrode plate 121 is a positive electrode and that the second electrode plate 122 is a negative electrode.

The separator 123 may be positioned between the first electrode plate 121 and the second electrode plate 122. The separator 123 may be made of a porous film of polyethylene (PE), polypropylene (PP), or a composite film of polyethylene (PE) and polypropylene (PP). The separator 123 may intercept electronic conduction between the first electrode plate 121 and the second electrode plate 122 in the electrode assembly 120, and may facilitate the movement of lithium ions. The separator 123 may prevent the first electrode plate 121 and the second electrode plate 122 from contacting each other, and may also maintain the temperature of the battery pack 10 by shutting down when the temperature of the battery pack 10 rises due to an external short.

The electrode assembly 120 may be supplied with electric power during charging of the battery pack 10 by which the lithium ions are interposed from the first electrode plate 121 to the second electrode plate 122. During discharge of the battery pack 10, the lithium ions are interposed from the second electrode plate 122 to the first electrode plate 121 so that electric power may be supplied to an external electronic apparatus through the electrode assembly 120.

The cap assembly 130 may include a cap plate 131, an insulating plate 132, a terminal plate 133, an electrode terminal 134, and a gasket 135. The cap assembly 130 may be coupled to the electrode assembly 120 in the opening 110a of the can 110 to seal the can 110 together with an additional insulating case 136 positioned under the cap assembly. A hole (not shown) may be formed in the insulating case 136 so that an electrolyte may be injected into the electrode assembly 120.

The cap plate 131 may be positioned in the opening 110a of the can 110 and may be made of a metal plate having a size corresponding to the opening 110a of the can 110. A hole 131a of a preset size is formed in the center of the cap plate 131 such that the electrode terminal 134 and the gasket 135 may be inserted into the hole 131a. An electrolyte injection hole 131b may be formed on one side of the cap plate 131. The electrolyte injection hole 131b may be sealed by an electrolyte injection cover 137 after the electrolyte is injected into the can 110. The top of the electrolyte injection cover 137 may protrude above the top of the cap plate 131. A safety vent (not shown) may be formed on one surface of the cap plate 131 corresponding to the electrolyte injection hole 131b around the hole 131a. The cap plate 131 may contact the first electrode tab 121a to be electrically connected to the first electrode tab 121a. Therefore, the cap plate 131 may have the same polarity as that of the first electrode plate 121.

The insulating plate 132 may be made of a plate and be positioned under the cap plate 131. The insulating plate 132 may be made of the same insulating material as that of the gasket 135.

The terminal plate 133 may be made of a plate and be positioned under the insulating plate 132. According to embodiments, the terminal plate 133 may be made of nickel or a nickel alloy. The insulating plate 132 and the terminal plate 133 may have holes formed in a position corresponding to and having the same structure as that of the hole 131a formed at the center of the cap plate 131.

The electrode terminal 134 may be inserted into holes formed in the cap plate 131, the insulating plate 132, and the terminal plate 133. The electrode terminal 134 may protrude from the center of the top of the cap plate 131. The electrode terminal 134 may contact and be electrically connected to the second electrode tab 122a. Therefore, the electrode terminal 134 may have the same polarity as that of the second electrode plate 122.

The gasket 135 may be positioned between the electrode terminal 134 and the cap plate 131. The gasket 135 may insulate the electrode terminal 134 from the cap plate 131.

Hereinafter, the connection of the bare cell 110, the protective circuit module 400, and the insulating layer 200 will be described in detail.

Referring to FIGS. 1 to 5, the battery pack 10 according to an embodiment of the present invention may be manufactured compactly. Specifically, after the insulating layer 200 is positioned on the cap plate 131 of the bare cell, the protective circuit module 400 may be positioned to contact the surface of insulating layer 200 and to remove the space between the protective circuit module 400 and the bare cell 100. According to the above-described structure, the capacity of the battery pack 10 may be maintained and the volume of the battery pack 10 reduced so that the capacity density (capacity/volume) of the battery pack 10 is increased.

The insulating layer 200 may be positioned on the cap plate 131. The insulating layer 200 may have a size corresponding to that of the cap plate 131, excluding the curved sides of the cap plate 131, and may have a rectangular flat plate structure. Therefore, the area of the insulating layer 200 may be smaller than the area of the cap plate 131. The insulating layer 200 may be positioned to contact the cap plate 131. More particularly, the bottom of the insulating layer 200 may be adhered to the top of the cap plate 131. A first terminal hole 200a may be formed in a region of the insulating layer 200 corresponding to the electrode terminal 134 and the gasket 135 such that the electrode terminal 134 and the gasket 135 may be inserted into the first terminal hole 200a. In addition, a first cover hole 200b may be formed in a region of the insulating layer 200 corresponding to the electrolyte injection cover 137 such that the electrolyte injection cover 137 may be inserted into the first cover hole 200b. The edges of the insulating layer 200 may be defined by a first short side 201, a second short side 202 corresponding to the first short side 201, a first long side 203, and a second long side 204 corresponding to the first long side 203.

The insulating layer 200 may be made of an insulating material to insulate the bare cell 100, more particularly, the cap plate 131 from the protective circuit module 400. According to embodiments, the insulating layer 200 may be made of paper or plastic. The insulating layer 200 may be an adhesive layer, and have an adhesive material formed only on one side or on both sides of the adhesive layer.

The protective module 400 may include a protective circuit board 410, a positive temperature coefficient (PTC) unit 420, protective circuit elements 430, a charge and discharge terminal unit 440, and a first lead plate 450. The first lead plate 450 may be included in the protective circuit module 400, or may be separated from the protective circuit module 400.

The protective circuit module 400 may be positioned on the top of the bare cell 100 to protect the battery pack 10 against overcharge and over-currents and to improve performance by preventing deterioration of the battery pack due to over-discharge.

The protective circuit board 410 may be positioned to contact the insulating layer 200, and more particularly, the bottom of the protective circuit board 410 may be adhered to the top of the insulating layer 200. The protective circuit board 410 may have a size corresponding to that of the cap plate 131, excluding the curved sides of the cap plate 131, and may have a parallelepiped shape. Therefore, the area of the protective circuit board 410 may be smaller than the area of the cap plate 131. The area of the protective circuit board 410 may correspond to the area of the insulating layer 200. In the region of the protective circuit board 410 corresponding to the electrode terminal 134 and the gasket 135 of the bare cell 100, a second terminal hole 410a may be formed. The electrode terminal 134 and the gasket 135 may be inserted into and passed through the second terminal hole 410a. The protective circuit board 410 may be a printed circuit board (PCB). In the region of the protective circuit board 410 corresponding to the electrolyte injection cover 137, a groove 410b may be formed to remove interference between the electrolyte injection cover 137 and the protective circuit board 410. Instead of the groove 410b, a second cover hole (not shown) having a structure corresponding to the first cover hole 200b of the protective circuit board 410 may be formed. When the height of the electrolyte injection cover 137 is lower than the height of the insulating layer 200, since the electrolyte injection cover 137 does not interfere with the protective circuit board 410, a hole or groove need not be formed in the protective circuit board 410. In such a case, the first cover hole 200b may be formed only in the insulating layer 200. The edges of the protective circuit board 410 may be defined by a first short side 411, a second short side 412 corresponding to the first short side 411, a first long side 413, and a second long side 414 corresponding to the first long side 413.

In battery packs of the prior art, a space no less than the height by which an electrode terminal protrudes above a bare cell is typically formed between a protective circuit module and the bare cell. However, in the battery pack 10 according to an embodiment of the present invention, the bottom of the protective circuit module 400 can contact the top of the bare cell 100 through the insulating layer 200 such that no space is present between the circuit module and the bare cell and a compact battery pack may be manufactured. In more detail, after the insulating layer 200 is brought into contact with the top surface of the bare cell 100 such that it is positioned to insulate the bare cell 100 from the protective circuit module 400 and to firmly couple the bare cell 100 with the protective circuit module 400, the protective circuit board 410 may be positioned on the insulating layer 200 to be brought into contact with the top surface of the insulating layer 200. In this case, the height of the space that would have been present between the protective circuit module 400 and the bare cell 100 is larger than the thickness of the insulating layer 200. As a result, the space may be removed so that a compact battery pack is manufactured and the volume of the battery pack reduced so that its capacity density (capacity/volume) is increased. The first cover hole 200b may be formed on a position of the insulating layer 200 corresponding to the electrolyte injection cover 137, and the groove 410b or a second cover hole (not shown) may be formed on a position corresponding to the electrolyte injection cover 137 of the protective circuit board 410. Therefore, interference among the insulating layer 200, the protective circuit board 410, and the electrolyte injection cover 137 may be reduced so that the protective circuit board 410 is stably provided on the bare cell 100. The space occupied by the electrolyte injection cover 137 may be compensated by the groove or the hole, so that the volume of the battery pack 10 is reduced and its capacity density increased.

The protective circuit board 410 may be patterned with a conductive metal (not shown) which may be electrically connected to the PTC unit 420, the protective circuit elements 430, the charge and discharge terminal unit 440, and the first lead plate 450.

The PTC unit 420 can be positioned on the protective circuit board 410. Specifically, the PTC unit 420 may include a first tab 421 electrically connected to a terminal unit 415 formed on the protective circuit board 410, a PTC element 422 positioned on the first tab 421 and electrically connected to the first tab 421, and a second tab 423 positioned on the PTC element 422 and electrically connected to the electrode terminal 134. The second tab 423 may be welded to the electrode terminal 134 so that it is firmly coupled with the electrode terminal 134, such as by laser welding or resistance welding. The PTC element 422 is a device with an almost infinite electric resistance when temperature is larger than a threshold temperature, and may intercept charge and discharge current when the temperature of the battery pack 10 is abnormally high. Since the PTC element 422 works reversibly, the PTC element 422 can operate to interrupt electric current. Then, when the temperature of the battery pack 10 drops, the resistance of the PTC element 422 may be reduced so that the battery pack 10 works again. Since the PTC unit 420 is electrically connected to the electrode terminal 134 of the bare cell, the PTC unit 420 may serve as a negative electrode lead plate.

The protective circuit elements 430 may be mounted on the opposite side to the terminal unit 415 about the second terminal hole 410a of the protective circuit board 410. The protective circuit elements 430 may include a plurality of passive and active elements and may be electrically connected to the conductive metal. The protective circuit module 400 may check information on the charge and discharge states and the current, voltage, and temperature of the battery for protection of the battery.

The charge and discharge terminal unit 440 may be spaced away from the top of the protective circuit elements 430, and may be mounted on the surface of the protective circuit board 410. The charge and discharge terminal unit 440 may be electrically connected to the conductive metal and may serve as an electric path to an external electronic device. The charge and discharge terminal unit 440 will be described in detail with reference to FIGS. 6 to 8.

The first lead plate 450 may be positioned on the first short side 411 of the protective circuit board 410 and may electrically connect the protective circuit board 410 to the bare cell 100. Therefore, the first lead plate 450 may become a positive electrode lead plate. In more detail, the first lead plate 450 may include a first plate 451 positioned on the first short side 411 of the protective circuit board 410 and electrically connected to the protective circuit board 410, a second plate 452 positioned on the cap plate 131 of the bare cell 100 and electrically connected to the bare cell 100, and a third plate 453 for electrically connecting the first plate 451 to the second plate 452. Here, the sum of the height of the second plate 452 and the height of the third plate 453 may correspond to the sum of the thickness of the insulating layer 200 and the thickness of the protective circuit board 410.

An existing lead plate may support the space between the bare cell, and the protective circuit module spaced away from the bare cell, and May connect the bare cell and the protective circuit module. Therefore, the lead plate may have a height equal to the space so that an undesired space is left after the battery pack is completed. However, in a battery pack according to an embodiment of the present invention, the protective circuit module 400 may be brought into contact with the top surface of the cap plate 131, and the first lead plate 450 may be positioned on the bare cell 100 and the protective circuit module 400 such that the protective circuit module 400 may be clamped and fixed to the bare cell 100. Therefore, the space required to couple the cap plate 131 with the first lead plate 450 may be removed so that a compact battery pack may be manufactured and the battery pack may be made small. The capacity of the battery of the bare cell 100 may be maintained and the coupling of the bare cell 100 with the protective circuit module 400 may be made compact so that the capacity density (capacity/volume) of the battery pack 10 is increased.

Figure 6:
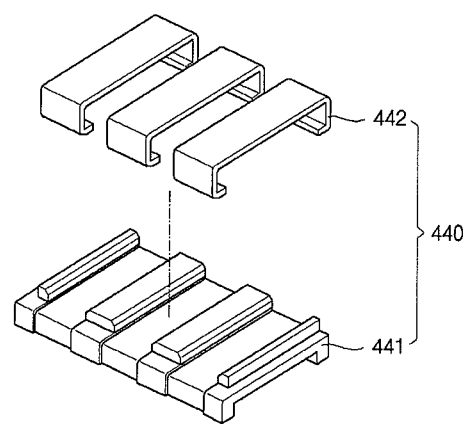
FIG. 6 is a sectional view illustrating a protective circuit module in a battery pack according to another embodiment.
Figure 7:
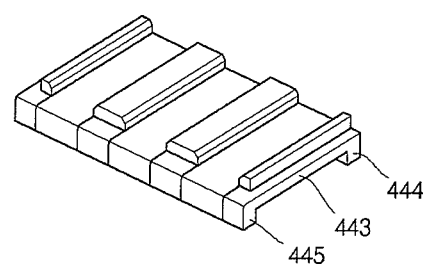
FIG. 7 is a sectional view illustrating a protective circuit module in a battery pack according to another embodiment.
Figure 8:
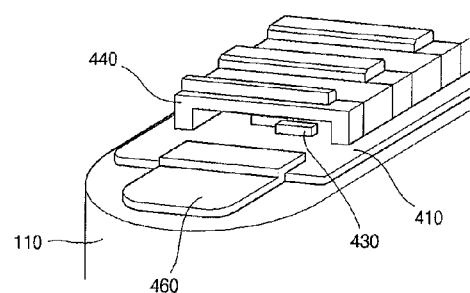
FIG. 8 is an exploded perspective view illustrating a charge and discharge terminal unit in the battery pack according to an embodiment.

FIG. 6 is an exploded perspective view illustrating the charge and discharge terminal unit of a battery pack according to an embodiment of the present invention. FIG. 7 is a perspective view illustrating the charge and discharge terminal unit of a battery pack according to an embodiment of the present invention. FIG. 8 is a partial perspective view illustrating a battery pack according to an embodiment of the present invention.

Referring to FIGS. 6 to 8 together with FIG. 3, in the battery pack 10 according to an embodiment, the charge and discharge terminal unit 440 may be positioned on the protective circuit board 410 and the protective circuit elements 430. The charge and discharge terminal unit 440 may be divided into a housing 441 and charge and discharge terminals 442 in accordance with materials. The charge and discharge terminal unit 440 may include a base 443, a first support 244, and a second support 445 which are divided in accordance with structures. The charge and discharge terminal unit 440 may be exposed to the outside by a charge and discharge terminal groove 720a of the top case 720.

Referring to FIG. 6, the charge and discharge terminal unit 440 will be divided in accordance with materials and described. In the charge and discharge terminal unit 440, the housing 441 and the charge and discharge terminals 442 may be integrally molded. In FIG. 6, the housing 441 and the charge and discharge terminals 442 may be separated from each other. The housing 441 may have a groove, with a preset width and length formed at the center of the bottom thereof. The section taken along the shorter side of the housing 441 may have a staple shape. The housing 441 may be made of an insulating material. The charge and discharge terminals 442 may include a plurality of metal plates serving as a positive electrode, an identification (ID) resistor, and a plurality of metal plates serving as a negative electrode and obtained by plating phosphor bronze with gold. According to an embodiment, the charge and discharge terminals 442 may include three metal plates. The charge and discharge terminals 442 may be mounted on the surface of the protective circuit board 410 such that the bottom of the charge and discharge terminals 442 contact the surfaces of mount units 417 positioned on the first long side 413 and the second long side 414 of the protective circuit board 410. The charge and discharge terminals 442 may be electrically connected to the conductive metal of the flexible protective circuit board.

Referring to FIG. 7, the charge and discharge terminal unit 440 will be divided in accordance with structures and described. The charge and discharge terminal unit 440 may include the flat plate-shaped base 443, the first support 444 and the second support 445 to support both sides of the base 443. Here, the housing 441 and the charge and discharge terminals 442 are coupled with each other. The first support 444 and the second support 445 may be positioned on the first long side 413 and the second long side 414 of the protective circuit board 410 to support the base 443. Specifically, the first support 444 and the second support 445 may be mounted on the surface of the protective circuit board 410 and may support one side and the other side of the base 443 so that the base 443 is spaced away from the protective circuit board 410. At this time, the protective circuit elements 430 may be positioned between the first support 444 and the second support 445 on the protective circuit board 410. The bottom of the base 443 may be spaced away from the protective circuit elements 430.

Referring to FIG. 8, in the above-described structure, the charge and discharge terminal unit 440 may be formed such that the base 443 is positioned on the protective circuit elements 430 and that the first support 444 and the second support 445 are positioned on the first long side 413 and the second long side 414 of the protective circuit board 410. Specifically, the protective circuit elements 430 may be positioned between the first support 444 and the second support 445. The bottom of the base 443 may be supported by the first support 444 and the second support 445 so that it is spaced away from the protective circuit elements 430.

The area of the charge and discharge terminal unit 440 having the above-described structure, which is mounted on the protective circuit board 410, may be very small, and may be positioned over the protective circuit elements 430 such that the charge and discharge terminal unit 440 is compactly formed on the protective circuit board 410. Therefore, all of the elements required for manufacturing the protective circuit elements 430 may be effectively arranged on one surface of the protective circuit board 410, resulting in miniaturizing of the battery pack 10 and an increase in the capacity density (capacity/volume) of the battery pack 10.

Figure 9:
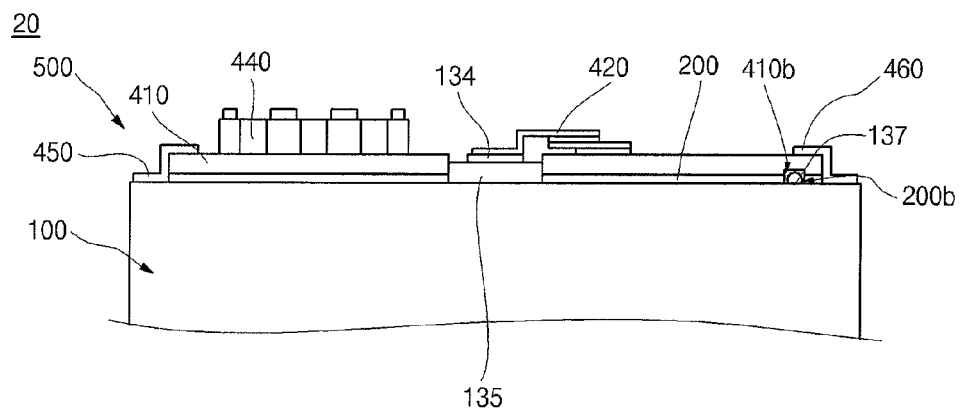
FIG. 9 is a perspective view illustrating the charge and discharge terminal unit in the battery pack according to an embodiment.

FIG. 9 is a sectional view illustrating a battery pack according to another embodiment of the present invention.

Referring to FIG. 9, the battery pack 20 according to another embodiment of the present invention may further include a second lead plate 460.

The second lead plate 460 may be positioned on the second short side 412 of the protective circuit board 410 and may be coupled with the cap plate 131. The second lead plate 460 may be electrically connected to the cap plate 131 and may function as a positive electrode lead plate like the first lead plate 450. However, the second lead plate 460 may become a dummy lead plate having the structure corresponding to the first lead plate 450. When the second lead plate 460 is the dummy lead plate, the second lead plate 460 may mechanically connect the bare cell 100 to a protective circuit module 500 to improve a coupling force. Regardless of whether the second lead plate 460 is the positive electrode lead plate or the dummy lead plate, the second lead plate 460 may have the same structure as that of the first lead plate 450.

Figure 10:
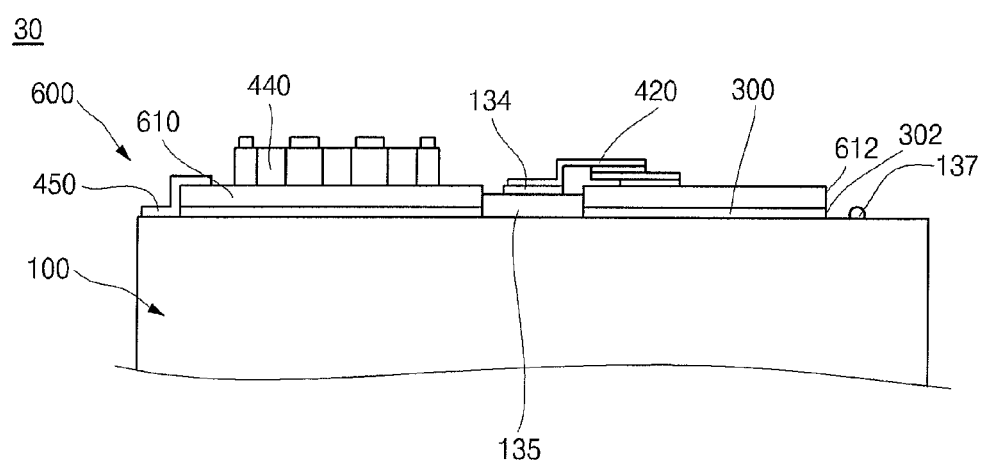
FIG. 10 is a partial perspective view illustrating the battery pack according to an embodiment.

FIG. 10 is a sectional view illustrating a battery pack according to another embodiment of the present invention.

Referring to FIG. 10, in the battery pack 30 according to another embodiment of the present invention, a second short side 302 of an insulating layer 300 and a second short side 612 of a protective circuit board 610 may be positioned between an electrode terminal 134 and an electrolyte injection cover 137.

The second short side 612 of the protective circuit board 610 may be positioned inside the electrolyte injection cover 137 so that the size of the protective circuit board 610 in a longitudinal direction can be remarkably reduced. Therefore, the size of a protective circuit module 600 and the size of the insulating layer 300 adhering the protective circuit module 600 to a bare cell 100 may be reduced so that the material cost of the protective circuit module 600 and the insulating layer 300 is reduced. The volume of the battery pack 30 may be reduced so that the capacity density of the battery pack 30 is increased.

The battery packs described with reference to FIGS. 1 to 10 include new protective circuit modules that are very different from existing protective circuit modules of the prior art, and thus, coupling relationships between the bare cell and the protective circuit modules have been described.

Each of the battery packs according to the above-described embodiments has a structure in which the PCT unit, the protective circuit elements, the charge and discharge terminal unit, and the lead plates are all coupled with one surface of the protective circuit board to be electrically and mechanically connected to each other. Therefore, the space between the existing bare cell and protective circuit module may be removed so that a slimmer battery pack is manufactured. In addition, in embodiments of the battery pack as described above, the arrangement of the elements and configuration thereof may be compact and eliminated undesired spaces.

Therefore, embodiments of the above-described battery pack may be small in size by reduction of the size of the internal elements and compact arrangement of the internal elements. Therefore, the bare cell can maintain its capacity and be compactly coupled with the protective circuit module so that the capacity density (capacity/volume) of the battery pack may be increased.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery pack, comprising:
a bare cell comprising a cap plate and an electrode terminal positioned on a center region of the cap plate;
an insulating layer positioned over the cap plate, wherein the insulating layer comprises a first terminal hole formed on a region corresponding to the electrode terminal; and
a protective circuit module positioned over the insulating layer, wherein the protective circuit module comprises a protective circuit board having a second terminal hole formed in a region corresponding to the electrode terminal wherein the protective circuit module is positioned on the insulating layer and the area of the protection circuit module and the insulating layer correspond to each other and wherein the insulating layer contacts the cap plate and the protective circuit board is positioned on the insulating layer so as to directly contact the insulating layer at the location of the cap plate so that the protective circuit board overlies the cap plate and the insulating layer is continuously interposed between the protective circuit module and the cap plate.

2. The battery pack of claim 1, wherein a bottom surface of the insulating layer is adhered to a top surface of the cap plate.

3. The battery pack of claim 1, wherein a bottom surface of the protective circuit board is adhered to a top surface of the insulating layer.

4. The battery pack of claim 1, further comprising an electrolyte injection cover that protrudes from a top surface of the cap plate,
wherein the insulating layer further comprises a cover hole in a region corresponding to the electrolyte injection cover.

5. The battery pack of claim 1, further comprising an electrolyte injection cover that protrudes from a top surface of the cap plate,
wherein the protective circuit board further comprises a cover hole or a groove in a region corresponding to the electrolyte injection cover.

6. The battery pack of claim 1, wherein the area of the insulating layer and the area of the protective circuit board are smaller than the area of the cap plate.

7. The battery pack of claim 1, wherein the insulating layer is formed of paper or plastic.

8. The battery pack of claim 1, wherein the insulating layer further comprises an adhesive agent attached to one or both surfaces thereof.

9. The battery pack of claim 1, wherein the protective circuit board is a printed circuit board.

10. The battery pack of claim 1, wherein the protective circuit module is positioned on a first short side of the protective circuit board and further comprises a first lead plate electrically connecting the protective circuit board to the bare cell.

11. The battery pack of claim 10, wherein the first lead plate comprises:
a first plate positioned on the first short side of the protective circuit board to be electrically connected to the protective circuit board;
a second plate positioned on the bare cell to be electrically connected to the bare cell; and
a third plate electrically connecting the first plate and the second plate to each other;
wherein the sum of the height of the second plate and the height of the third plate corresponds to the sum of the thickness of the insulating layer and the thickness of the protective circuit board.

12. The battery pack of claim 10, wherein the protective circuit board further comprises a second lead plate positioned on a second short side of the protective circuit board to mechanically or electrically connect the protective circuit board to the bare cell.

13. The battery pack of claim 1, wherein the protective circuit module comprises a charge and discharge terminal unit positioned on the protective circuit board to electrically connect the bare cell to an external device.

14. The battery pack of claim 1, wherein the protective circuit board further comprises a PTC unit electrically positioned on the protective circuit board and connected to the electrode terminal.

15. The battery pack of claim 1, further comprising:
a top case covering a top surface of the protective circuit module and the bare cell;
a bottom case covering a bottom surface of the bare cell; and
a label surrounding an external surface of the bare cell.

16. The battery pack of claim 15, wherein the top case is coupled to the bare cell by an adhesive.

17. A battery pack, comprising:
a bare cell comprising:
a cap plate;
an electrode terminal protruding from a center region of a top surface of the cap plate; and
an electrolyte injection cover protruding from one side of the top surface of the cap plate;
an insulating layer positioned over the cap plate, wherein the insulating layer comprises a first terminal hole formed in a region corresponding to the electrode terminal; and
a protective circuit module positioned over the insulating layer, wherein the protective circuit module comprises a second terminal hole formed in a region corresponding to the electrode terminal wherein the protective circuit module is positioned on the insulating layer and the area of the protection circuit module and the insulating layer correspond to each other and wherein the insulating layer contacts the cap plate and the protective circuit board is positioned on the insulating layer at the location of the ca plate so as to directly contacts the insulating layer so that the protective circuit board overlies the cap plate and the insulating layer is continuously interposed between the protective circuit module and the cap plate,
wherein one side of the insulating layer and one side of the protective circuit board are positioned between the electrode terminal and the electrolyte injection cover.

* * * * *